US007168472B2

(12) United States Patent
Hirst et al.

(10) Patent No.: US 7,168,472 B2
(45) Date of Patent: Jan. 30, 2007

(54) METHOD AND APPARATUS FOR APPLYING VARIABLE CODED LABELS TO ITEMS OF PRODUCE

(75) Inventors: Richard Hirst, Norwich (GB); Richard Evans, Fresno, CA (US); Matthew Scott Howarth, Clovis, CA (US)

(73) Assignee: Sinclair Systems International, LLC, Fresno, CA (US)

( * ) Notice: Subject to any disclaimer, the term of this patent is extended or adjusted under 35 U.S.C. 154(b) by 0 days.

(21) Appl. No.: 11/069,330

(22) Filed: Mar. 1, 2005

(65) Prior Publication Data

US 2005/0211371 A1 Sep. 29, 2005

Related U.S. Application Data

(60) Provisional application No. 60/549,778, filed on Mar. 3, 2004.

(51) Int. Cl.
*B65C 9/46* (2006.01)
*B32B 37/12* (2006.01)
*B32B 38/14* (2006.01)

(52) U.S. Cl. ...................... 156/387; 156/363; 156/378; 156/379.8; 156/541; 156/DIG. 47

(58) Field of Classification Search ........ 156/DIG. 47, 156/387

See application file for complete search history.

(56) References Cited

U.S. PATENT DOCUMENTS 4,123,310 A * 10/1978 Varon et al. ................ 156/351
5,317,170 A * 5/1994 Paoli ........................... 257/88
5,413,629 A * 5/1995 Yasui et al. .............. 106/31.15
5,608,429 A * 3/1997 Hayashihara et al. .... 346/135.1
5,645,680 A * 7/1997 Rietheimer ................. 156/567
5,660,676 A * 8/1997 Brooks ....................... 156/361
5,738,755 A * 4/1998 Hartman ..................... 156/566
5,897,938 A * 4/1999 Shinmoto et al. ........... 428/354
6,140,267 A * 10/2000 Gundjian .................... 503/201
6,179,030 B1 * 1/2001 Rietheimer ................. 156/360
6,257,294 B1 * 7/2001 Weisbeck ................... 156/356
6,349,755 B1 * 2/2002 Sardo ......................... 156/360
6,423,399 B1 * 7/2002 Endo et al. ................. 428/206
6,427,746 B1 * 8/2002 Anderson et al. ........... 156/541
6,668,896 B1 * 12/2003 Granero Tormo ........... 156/556
6,815,147 B2 * 11/2004 Fischer ....................... 430/293
6,824,849 B2 * 11/2004 Herzog et al. ............. 428/40.1
6,830,642 B2 * 12/2004 Greenhill et al. ........... 156/230
2004/0194891 A9 * 10/2004 Constantine et al. ....... 156/350
2005/0039858 A1 * 2/2005 Arrington ................... 156/540

* cited by examiner

*Primary Examiner*—Melvin Mayes
(74) *Attorney, Agent, or Firm*—Bruce H. Johnsonbaugh

(57) ABSTRACT

An apparatus and method are provided for automatically labeling individual produce items. Individual produce items are conveyed towards a rotary bellows or other applicator. A sensor senses at least one variable characteristic, such as size of each of the produce items. The sensed variable is transmitted to a laser coding device and a variable human or machine readable code is printed on an individual label prior to application of that label to the specific item of produce for which the variable characteristic was sensed. The laser coding beam either reacts with a reactive or ablatable film on each label.

3 Claims, 8 Drawing Sheets

METHOD AND APPARATUS FOR APPLYING VARIABLE CODED LABELS TO ITEMS OF PRODUCE

CROSS-REFERENCE TO RELATED APPLICATION

This application claims the benefit of and priority from U.S. provisional application No. 60/549,778 filed Mar. 3, 2004.

BACKGROUND AND BRIEF SUMMARY OF INVENTION

The present invention pertains generally to the automatic labeling of fruit and vegetables. More particularly, the invention provides a system for applying variable information "on the fly" to labels for single items of produce. The invention greatly reduces the number of labeling machines, label designs, and label inventory needed to automatically apply labels to produce. The invention simplifies packing operations and reduces costs by reducing the labor and label inventory required to automatically label produce.

The prior art typically requires separate labeling machines and label designs for each price look up or "PLU" number. PLU numbers are required by retailers to facilitate quick handling and accurate pricing of produce at checkout. For example, in order to apply labels denoting "small" or "medium" or "large" size designations for apples, the prior art typically requires three separate labeling machines, three separate label designs, and three label inventories. If a packhouse packs more than one brand, the equipment configuration is duplicated. This label application equipment is expensive, requires maintenance, and requires a significant amount of physical space on the sizer and thereby restricts where the packing operation may place their drops to further pack the fruit. The present invention facilitates the same labeling with only one labeling machine and one label design.

The present invention uses a laser to produce variable human or machine-readable codes on a pressure sensitive thin film produce label just prior to application. A laser-coding device is used to create a visible code on the label. The code can be produced by either marking directly onto the printed surface of the label, or by marking the printed surface from the backside, through the adhesive and film layers.

The laser coding machine receives a signal from the sizer or other sensing device that triggers the system to print variable information to individual labels which are subsequently applied to specific targeted fruit or other produce.

The use of this invention enables the printing of variable information on produce labels just prior to the label being applied to the produce, referred to herein as "print and apply," by printing variable information specific to the targeted fruit or other produce. This allows the use of a common label with pre-printed standard information, thereby eliminating the need for multiple labeling machines and inventory of specific labels for each classification of produce being labeled.

The coding device uses a laser to produce a high intensity light beam to etch or mark the outer surface of the label. The laser light reacts with or removes material that is sensitive to the laser beam. This material can be an ink, a coating, and/or a filler which may react by changing color or by removing the ink and exposing a different color beneath the ink layer, thereby producing the code or mark. Using lasers in printing systems to react with or ablate layers of ink or other materials are known in the prior art, for example, in U.S. Pat. Nos. 5,884,293; 6,103,989; 6,372,394 and 6,815,147; each of which is incorporated by reference. Other types of ink, substrates and lasers may also be used in the invention.

This invention may be used on any standard type labeling machine used in the produce labeling industry for automatically applying adhesive labels to produce, such as the standard Sinclair model RM6 (as shown and described in LaMers U.S. Pat. Nos. 4,217,164; 4,303,461; 4,454,180; 4,547,252; and Briggs et al U.S. Pat. No. 4,896,793, all of which are incorporated herein by reference as though set forth in full) or SPRM6 labeling system. The invention uses produce labels, a laser coding device, and an interface to control the laser from the host produce sorting equipment. The RM6 and SPRM6 labeling systems are used in the conventional way to apply labels to the produce. The Sinclair model RM6 and SPRM6 machines and Sinclair labels are commercially available from Sinclair Systems International, LLC, 3115 South Willow Avenue, Fresno, Calif. 93725.

The labeling system provides a means to apply the label to each individual piece of produce. The labeling system presents a label with a pre-printed surface to the laser on which the laser creates a predetermined code in response to a signal from the sizer or other sensing device. The laser provides the high intensity light to mark the label, and the interface interprets the information from the sizer (or other sensing device) to control the output of the laser. Interfaces for controlling lasers are known in the art, as shown in U.S. Pat. Nos. 5,884,293 and 6,372,394, referred to above.

A primary object of the invention is to provide an apparatus and method for applying variable information "on the fly" to labels just prior to the label being applied to a single item of produce.

A further object of the invention is to provide a "print and apply" system for applying coded information specific to a given produce item to a specific label just prior to that specific label being applied to the specific produce item.

Another object is to provide an automatic labeling system for produce which significantly reduces the number of labeling machines and label designs otherwise required to label a given quantity of produce.

Other objects and advantages will become apparent from the following description and drawings, wherein

DETAILED DESCRIPTION OF THE DRAWINGS

The drawings and the following description illustrate the preferred form of the invention, in which a rotary bellows applicator transfers individual labels from a label carrier strip to a specific produce item moving on a produce conveyor. The invention can be adapted to other types of automatic labeling machines.

The following description includes an example of applying variable size information, such as "small," "medium" or "large" legends to specific labels in response to a sensor that senses the size of a specific produce item about to be labeled. The invention can also be utilized to apply grading, ripeness or firmness information pertinent to the produce being labeled.

Figure 1A:
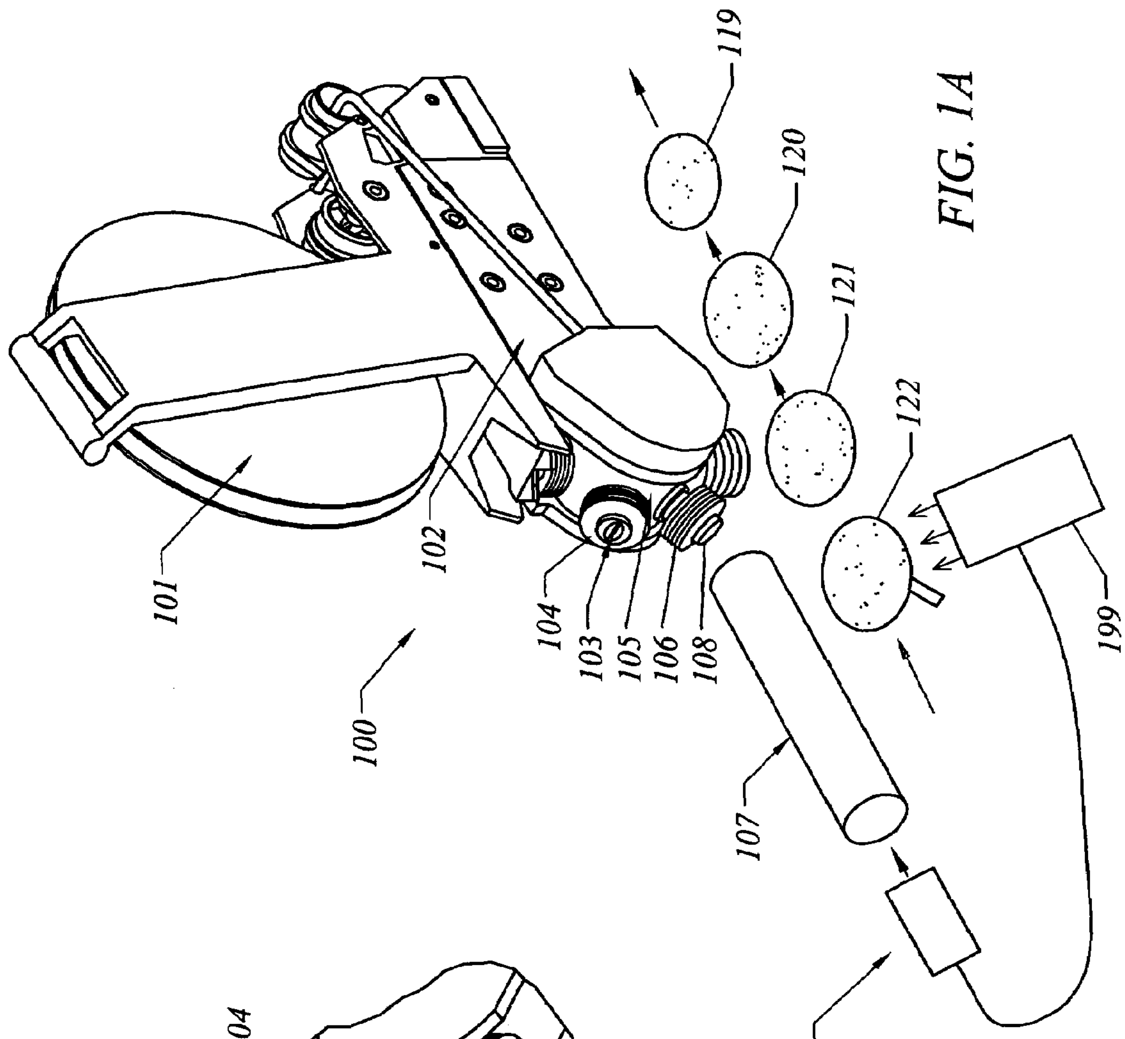
FIG. 1A is a schematic representation of a first embodiment of the invention.
Figure 1B:
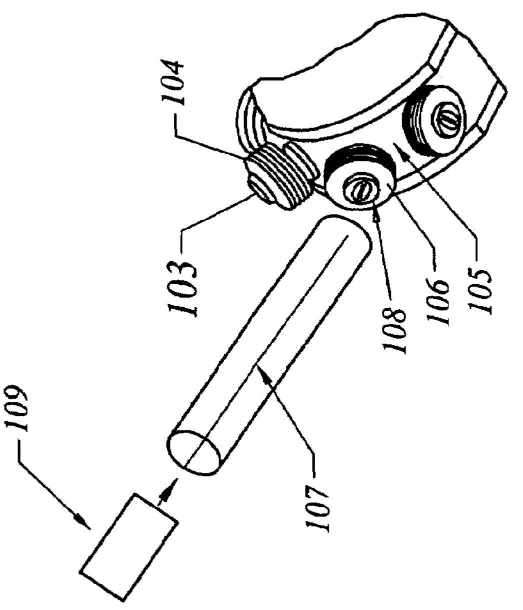
FIG. 1B is a bottom perspective view of a portion of the apparatus shown in FIG. 1A.

With reference to the drawings, FIG. 1A is a schematic representation of the labeling system 100 according to the invention. A label supply cassette 101 is carried by a commercially available Sinclair RM6 or SPRM6 machine. Produce items 119–122 are shown in FIG. 1A being conveyed past applicator 102. Label applicator 102 places an individual label 103 on the tip of a single bellow 104. A plurality of bellows is carried on a rotary application head 105. A specific bellow 106 is shown in FIG. 1B in the pathway of laser beam direction tube 107. Sensor 199 senses the size of produce item 122 and transfers that information to laser coding means 109. Tube 107 directs the output of laser 109 with the size of produce item 122 to the label 108 carried on bellow 106, immediately before the label 108 is applied to the appropriate and corresponding pocketed and aligned fruit item 122.

Figure 2:
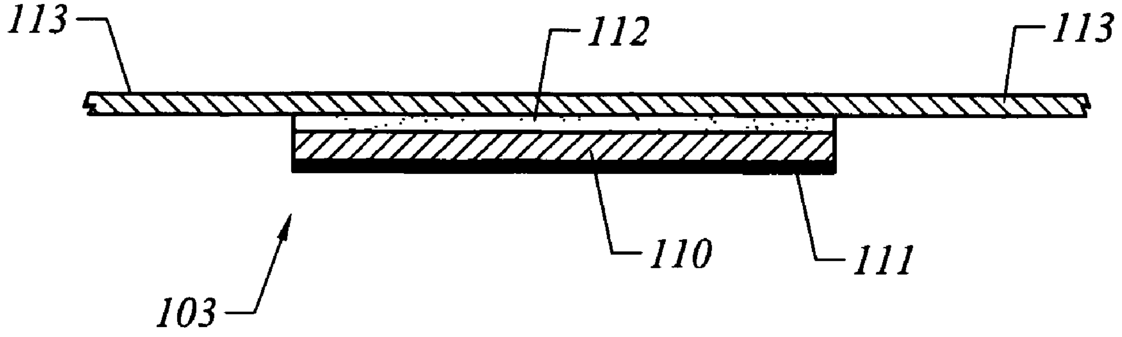
FIG. 2 is a sectional view of the layers utilized in a label as illustrated in FIGS. 1A and 1B.

FIG. 2 is a schematic representation showing the layers utilized in label 103 in FIGS. 1A and 1B along with paper carrier 113. Label 103 comprises a thin film plastic substrate 110 which forms the body of the individual label 103. In the orientation shown in FIG. 2, the bottom surface of plastic substrate is coated with an ink layer 111 in accordance with the present invention. The upper layer of substrate 110 is coated with an adhesive layer 112 which serves to adhere the plastic substrate 110 to the surface of the produce. Paper web 113 is a continuous web that carries thousands of individual labels 103.

Figure 3:
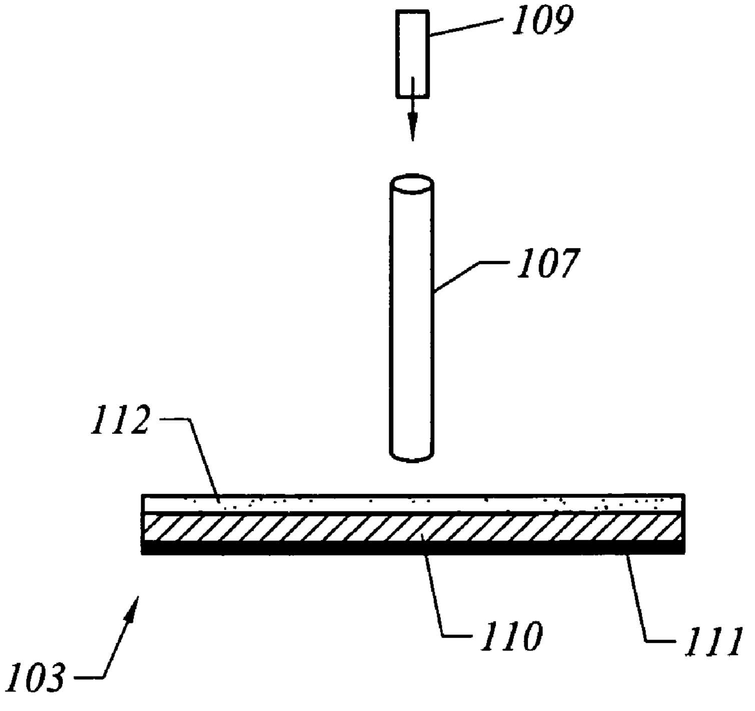
FIG. 3 is a schematic representation illustrating one embodiment of the invention wherein the output of the laser coding means is applied to the label after the label has been separated from the paper carrier strip.

FIG. 3 illustrates one embodiment of the invention wherein the output beam of laser 109 interacts with label 103 after the label 103 has been separated from the paper carrier backing 113, after the specific produce item 122 has been sized (for example), and just before label 103 is applied to the produce. Label 103 is carried on a bellows (not shown for clarity) which is beneath label 103 in the orientation shown in FIG. 3. The output of laser coding means 109 passes through a one or two dimensional galvanometric scanner, as known in the art, and through an optional guide tube 107 (see FIGS. 1A and 1B) and then through adhesive film 112 and the thin film plastic substrate 110 of label 103 and interacts with the ink coating on the bottom surface of the label 103 as shown in FIG. 3. Optionally, instead of using a single laser coupled with a galvanometer, an addressable solid state semiconductor laser array may be utilized as a laser coding means. As a further option, a solid state semiconductor laser array coupled with a light modulator may be utilized as a laser coding means.

Figure 4:
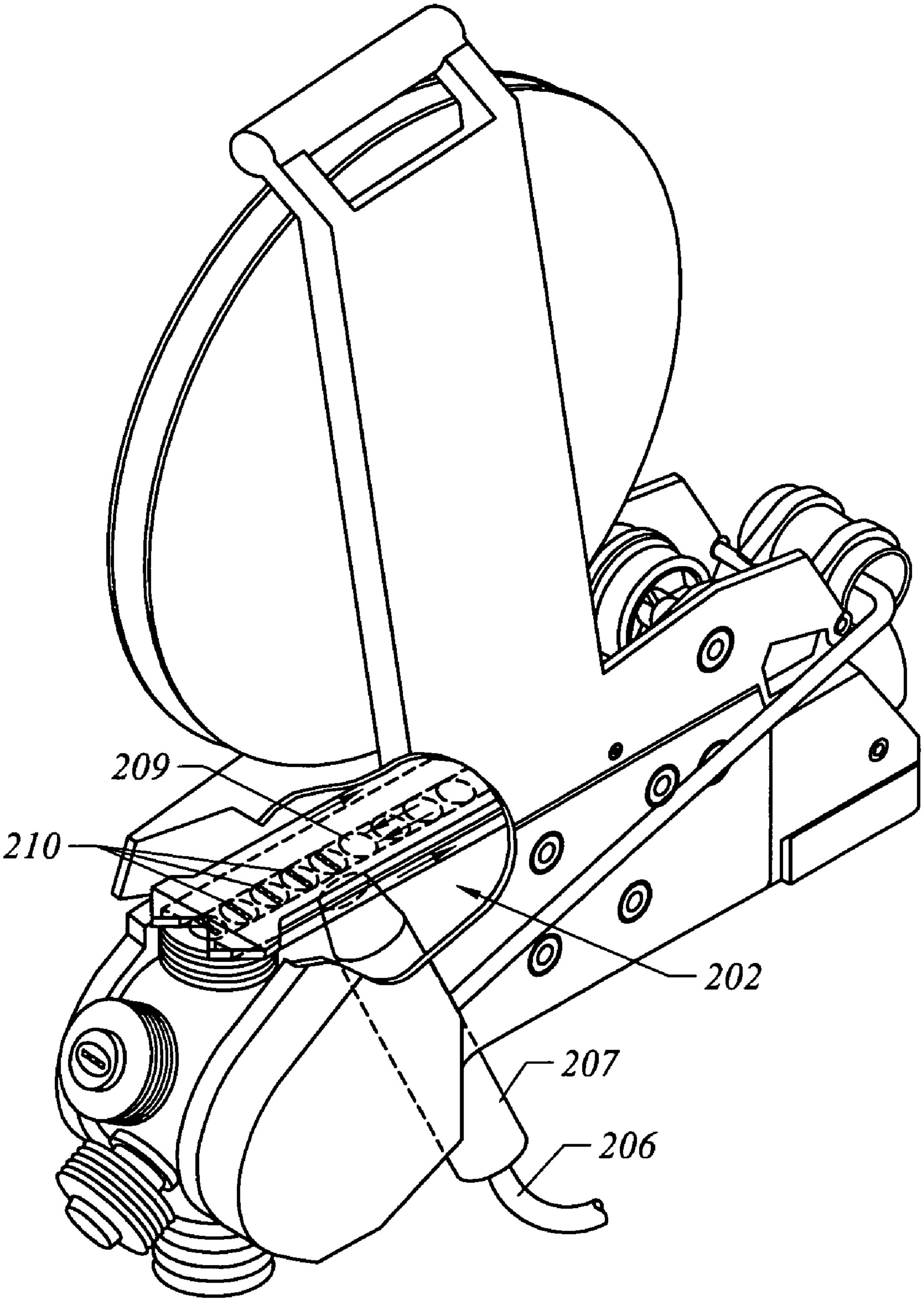
FIG. 4 is a schematic illustration of an alternate embodiment of the invention wherein the laser output is applied directly to the printed side of each label before the label is transferred to the rotary bellows applicator.

FIG. 4 illustrates an alternate embodiment of the invention using a modified label applicator 202 wherein the laser output passes through a fiber optic guide tube 206 to the opposite side of label strip 209 and the laser output beam is guided through a galvanometric scanner 207 and directly to the ink layer 111, as illustrated in FIGS. 3 and 4, without having to pass through the thin film plastic substrate 110 or the adhesive layer 112. This embodiment requires modification of the label feed housing in applicator 202 to allow placement of scanner 207 so that the laser printing can be done before the label is placed on a bellows. FIG. 4 includes a partially broken view of the carrier strip 209 carrying labels 210 on its lower surface as shown in FIG. 4. The laser output beam therefore exits scanner 207 and contacts the printed surface of the labels directly.

Figure 5:
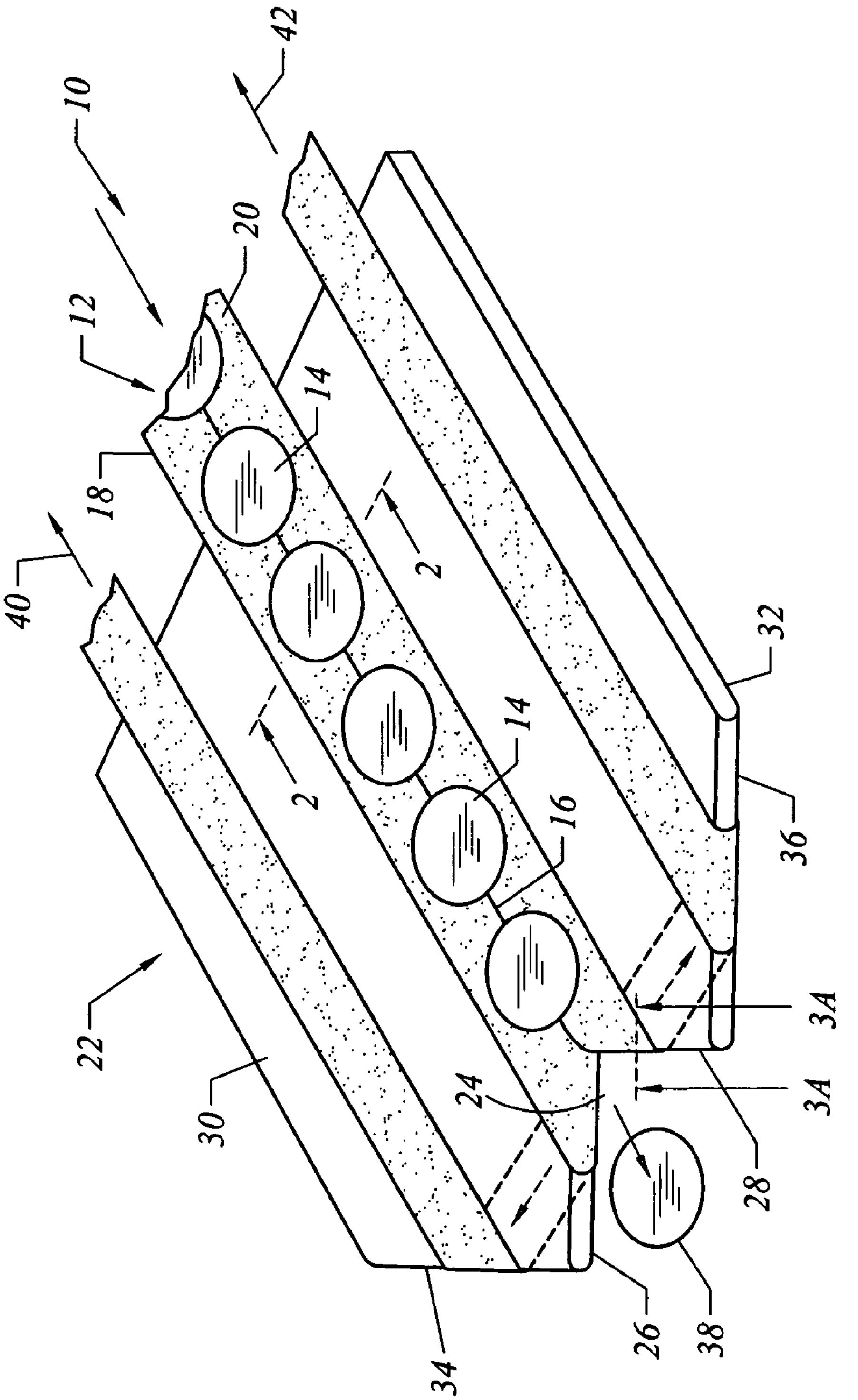
FIG. 5 (Prior Art)
FIG. 5 illustrates a prior art carrier strip for labels and illustrates how the labels are separated from the carrier strip.

FIG. 5 is a reproduction of a drawing of U.S. Pat. No. 4,303,461 and illustrates one form of label carrier strip usable in the present invention. However, the preferred embodiments of the present invention invert the carrier strip and plate from the positions shown in FIG. 5. For convenience, FIG. 5 is described briefly below. The prior art apparatus shown in FIG. 5 for stripping the labels 14 from the carrier strip 12 includes a label stripper or separator in the form of a plate 22 having a substantially V-shaped edge region or notch 24 which forms a pair of separator edges 26,28. The carrier strip with the labels thereon initially moves along an upper face 30 of the label separator towards the V-shaped edge portion or region 24, with the separation line 16 aligned with the apex of the V. Each of the carrier strip portions 18,20 extends around a different one of the separator edges 26,28, so that the carrier strip is pulled apart thereat. The strip portion 18 which extends around the separator edge 26, moves along the underside or lower face 32 of the plate, extends around an auxiliary guide edge 34, and then extends along the upper face 30 of the separator plate. The other carrier strip portion 20 extends in a corresponding manner, around the separator edge 28, around another auxiliary guide edge 36, and then along the upper face of the separator plate. It can be seen that as each label 14 moves into the V-shaped region 24, the two carrier strip portions 18,20 are directed downwardly and apart from each other, so that the label 38 is separated from its carrier strip. Separated label 38 is picked up by a bellow, as shown in FIG. 1A, to be transferred to a produce item.

FIGS. 6–11 are schematic representations illustrating the basic concept of the method of the present invention. The method is utilized to apply thousands of individual labels to thousands of individual items of produce. The produce items, labels and bellows preferably move continuously; the sensing means and laser coding means operate while the produce and labels are moving. FIGS. 6–11 in the interest of simplicity will be used to describe how an individual produce item, such as a "large" apple 333, will ultimately be labeled with a specific label 343, wherein the label is printed after the size of the apple is sensed but before the label is physically applied to the large apple 333. It is to be understood that the printing station 380 in FIGS. 6–11 may be located as shown in FIGS. 6–11, or as shown in FIGS. 1A and 1B, or in other locations.

Figure 6:
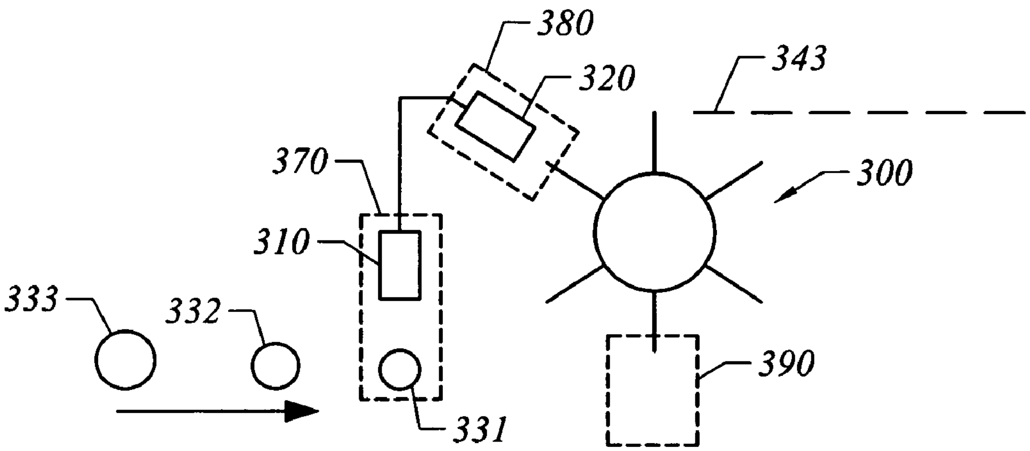
FIG. 6 is a schematic illustration in simplified form showing the first step of the method wherein produce items are being conveyed towards a sensing station.

The first step of the method is illustrated in FIG. 6 wherein a plurality of singulated produce items, such as different sized apples 331,332,333, are conveyed through a sensing station 370. In this example, sensing means 310 will sense whether the apples are "small," "medium" or "large" in accordance with sizing apparatus known in the prior art. The printing station 380 and labeling station 390 are shown schematically by dashed lines.

Figure 7:
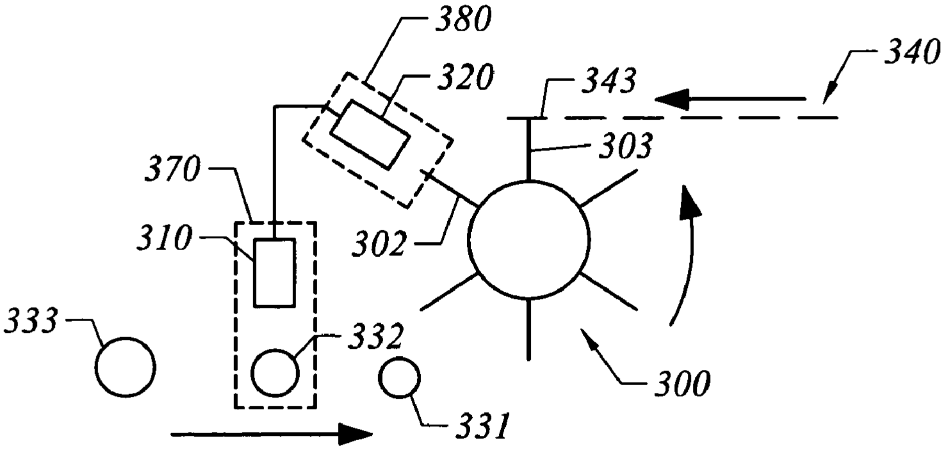
FIG. 7 illustrates the second step of the method wherein a plurality of labels are moved toward and through a printing station.

FIG. 7 shows a plurality of labels 340 moving to the left to be picked up by individual bellows 301–306 of rotary bellows applicator 300. FIG. 7 illustrates the step of moving the plurality of labels 340 one at a time toward and through a printing station 380 which includes the laser coding means 320. The labels are moved simultaneously with the produce being conveyed.

Figure 8:
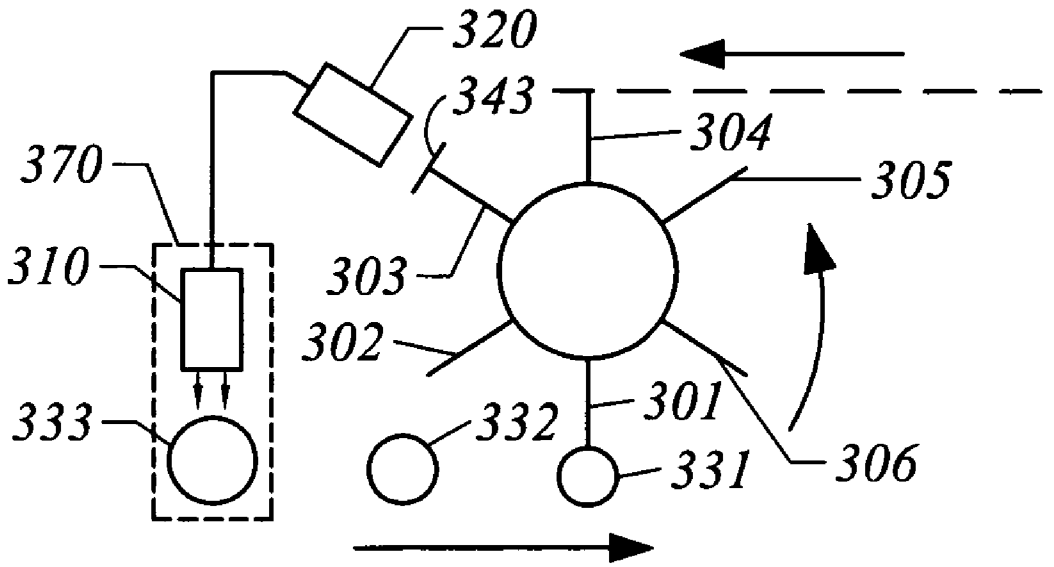
FIG. 8 illustrates the third step of the method wherein a sensing means is measuring the size or other characteristic of the produce item.

FIG. 8 shows the third step of the method wherein the "large" apple is moving through sensing station 370 wherein sensing means 310 is sensing the size of apple 333. Also shown in FIG. 8 is that bellow 303 has transferred individual label 343 into position to be printed at printing station 380 by the laser coding device 320.

Figure 9:
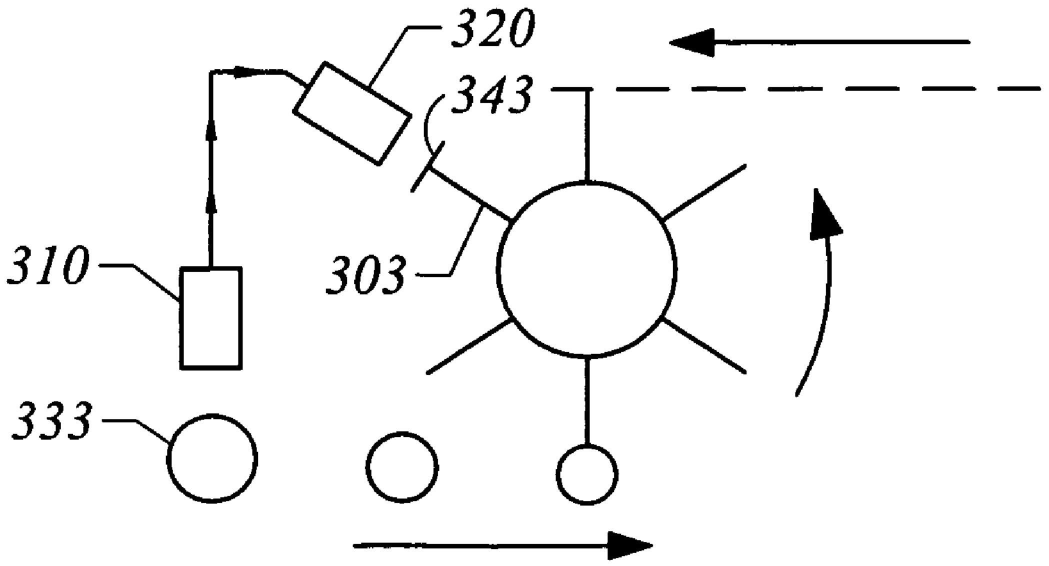
FIG. 9 illustrates the next step of the method wherein the sensed variable characteristic is transferred from the sensing means to the printing means.

FIG. 9 illustrates the fourth step of the method wherein the sensed variable characteristic, i.e., the "large" size of apple 333 is being transferred from sensing means 310 to the printing means or laser coding device 320.

Figure 10:
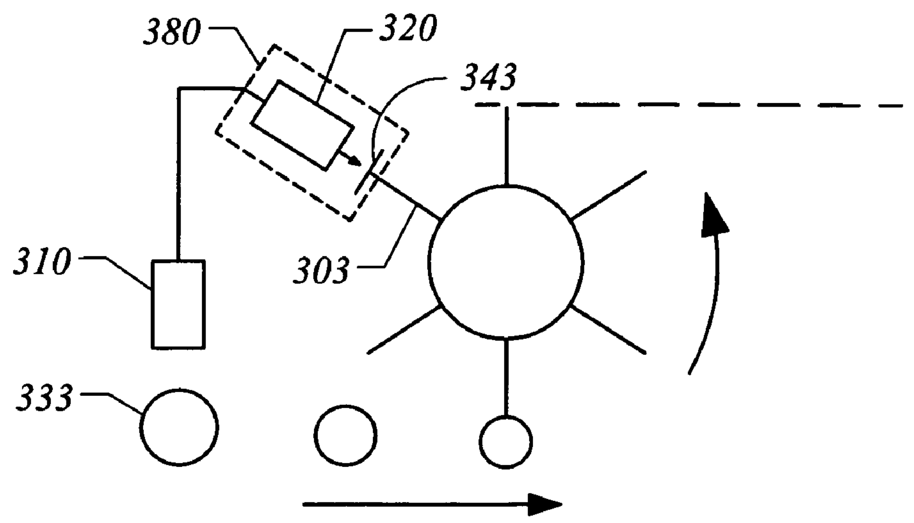
FIG. 10 illustrates the next step of the method wherein the printing means applies the transferred variable characteristic to a specific label as the label moves through the printing station.

FIG. 10 illustrates the fifth step of the process wherein the laser coding device 320 is printing the legend "large" onto label 343 at printing station 380. During the steps illustrated in FIGS. 8, 9 and 10, the individual bellow 303 moves continuously and transfers label 343 through printing station 380 to be printed by the laser coding means 320.

Figure 11:
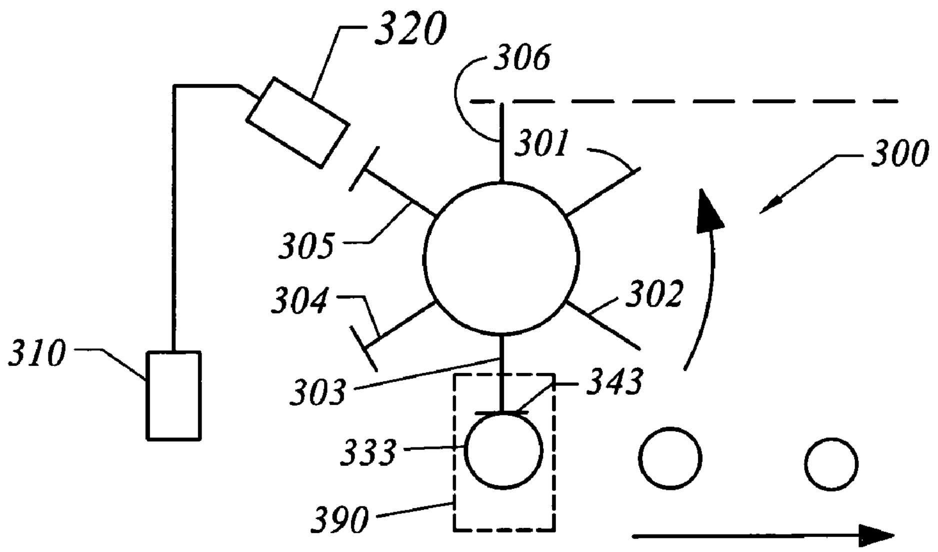
FIG. 11 applies the last step wherein the specific label for the specific apple or other produce item is applied to that particular produce item.

FIG. 11 illustrates the final step of the process wherein the individual bellow 303 has moved continuously two positions counterclockwise from its position shown in FIG. 10. The "large" apple 333 has moved continuously two positions to the right as shown in FIG. 11 and is at the labeling station 390 directly beneath the center of continuously rotating bellows applicator 300. The specific label 343 from which said variable characteristic was sensed and printed (i.e. the "large" size for apple 333) is applied to that specific apple 333 from which the characteristic was sensed.

Figure 12:
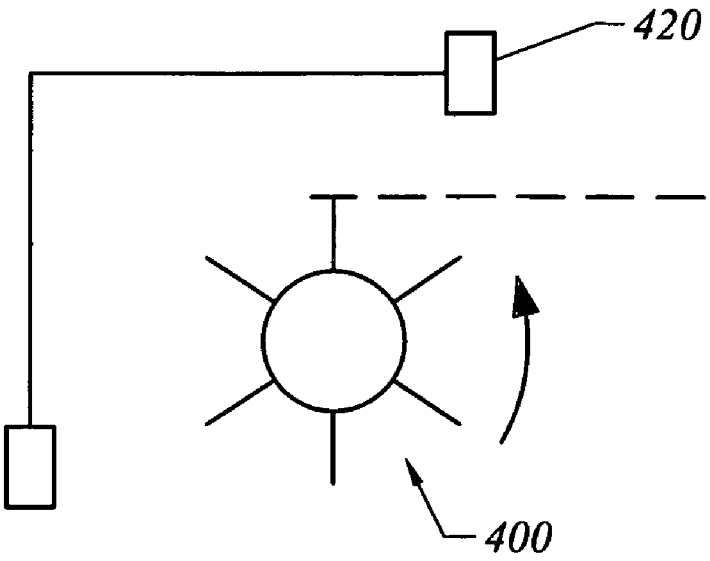
FIG. 12 is a schematic representation of an alternate method of the invention wherein the laser coding or printing means is positioned to print the labels before the labels are transferred to the bellows and wherein the printing is accomplished by the laser beam passing through the adhesive layer and then interacts with the reactive or ablatable surface of the label.

FIG. 12 illustrates an alternate method wherein the laser 420 is positioned above the incoming stream of labels before the labels are transferred to the rotary bellows applicator 400. In the position shown in FIG. 12, the output of laser 420 must pass through the adhesive layer carried on top of the labels to the bottom surface of the label which contains the reactive or ablatable film surface.

Figure 13:
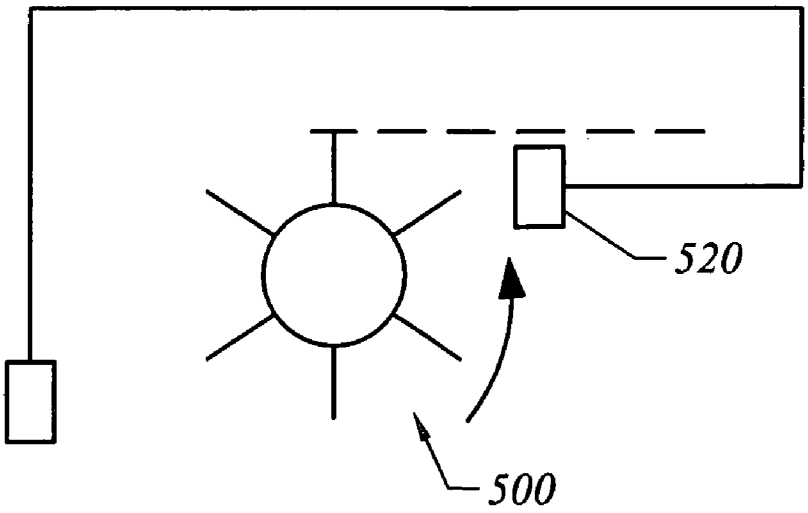
FIG. 13 illustrates an alternate method wherein the laser coding device is positioned below the labels in order to print directly on the printable ablative surface of the label without having to pass through the adhesive layer.

FIG. 13 shows another method wherein the laser 520 is positioned below the incoming stream of labels wherein the laser is able to print directly onto the printed label surface and the laser output beam does not have to pass through the adhesive label carried by the upper label surface as illustrated in FIG. 13. This method is used in the apparatus shown in FIG. 4.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. In an automatic labeling machine used to apply labels to produce, wherein a label applicator having a plurality of bellows carried on a rotary applicator head is utilized to transfer individual labels from a label carrier strip, onto the tip of a single bellows, and thereafter onto individual items of produce, the improvement comprising:

a plurality of plastic labels carried by said carrier strip, wherein each of said plastic labels has a plastic substrate, a laser reactive film carried by a first surface of each plastic label substrate and wherein each of said plastic labels has an adhesive layer carried by a second surface of each plastic label substrate, sensing means for sensing at least one variable characteristic of each of said individual items of produce, laser coding means operating in response to said sensing means for producing a variable human or machine readable code representative of said variable characteristic on each individual label prior to application of said individual label to the particular item of produce for which the variable characteristic was sensed, wherein said laser coding means includes a laser output beam that is directed at said individual label after said label has been transferred onto the tip of a bellows, and wherein said laser output beam passes through said adhesive layer of each label, and passes through said plastic substrate of each label, and reacts with said reactive film carried by said first surface of said plastic substrate to produce said variable code on said first surface of each of said plastic labels.

2. The apparatus of claim 1 wherein said laser coding means comprises an addressable solid state semiconductor array.

3. The apparatus of claim 1 wherein each of said labels is plastic and includes a laser ablative film which is ablated by said laser coding means to produce said coded information on said label.

* * * * *